(12) United States Patent
McDonald et al.

(10) Patent No.: US 10,880,722 B1
(45) Date of Patent: Dec. 29, 2020

(54) METHOD AND SYSTEM FOR INTEGRATED MOBILITY MANAGEMENT IN A CLOUD-BASED COMMUNICATION SYSTEM

(71) Applicant: MOTOROLA SOLUTIONS, INC., Chicago, IL (US)

(72) Inventors: Daniel J. McDonald, Cary, IL (US); Svend Frandsen, Koege (DK)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/668,482

(22) Filed: Oct. 30, 2019

(51) Int. Cl.
  *H04W 8/08* (2009.01)
  *H04W 76/40* (2018.01)
  *H04W 64/00* (2009.01)

(52) U.S. Cl.
  CPC ............ *H04W 8/08* (2013.01); *H04W 64/00* (2013.01); *H04W 76/40* (2018.02)

(58) Field of Classification Search
  CPC ........ H04W 8/08; H04W 64/00; H04W 76/40
  See application file for complete search history.

(56) References Cited

U.S. PATENT DOCUMENTS

| | | | |
|---|---|---|---|
| 5,313,653 A * | 5/1994 | Sasuta | H04W 72/0406 455/17 |
| 5,689,810 A | 11/1997 | Shaughnessy et al. | |
| 5,724,648 A * | 3/1998 | Shaughnessy | H04W 4/08 455/423 |
| 7,636,339 B2 * | 12/2009 | Shaffer | H04W 4/08 370/338 |
| 8,571,549 B2 | 10/2013 | Peterson et al. | |
| 8,861,419 B2 * | 10/2014 | Korus | H04W 72/005 370/312 |
| 8,886,182 B2 | 11/2014 | Peterson et al. | |
| 9,686,656 B2 * | 6/2017 | Pai | H04W 8/02 |
| 9,769,225 B2 * | 9/2017 | Kalburgi | H04W 4/08 |
| 10,425,986 B2 * | 9/2019 | Tian | H04W 4/16 |
| 2003/0017836 A1 * | 1/2003 | Vishwanathan | H04L 67/04 455/517 |
| 2009/0170488 A1 * | 7/2009 | Becker | H04W 72/0406 455/416 |
| 2012/0002588 A1 * | 1/2012 | Roy | H04W 64/00 370/315 |
| 2014/0286222 A1 * | 9/2014 | Yu | H04W 24/08 370/312 |

* cited by examiner

*Primary Examiner* — Julio R Perez

(57) ABSTRACT

A method and system for tracking endpoint location information of a first mobile device and a second mobile device that are members of a common talkgroup is provided. The first mobile device is located at a first communication system and the second mobile device is located at a second communication system. A first mobility update request from the first mobile device is received at a cloud-based mobility management service. The first mobility update request includes a request to update first endpoint location information of the first mobile device. The mobility management database is updated with the first endpoint location information. A second mobility update request from the second mobile device is received at the cloud-based mobility management service. The second mobility update request includes a request to update second endpoint location information of the second mobile device. The mobility management database is updated with the second endpoint location information.

12 Claims, 3 Drawing Sheets

US 10,880,722 B1

METHOD AND SYSTEM FOR INTEGRATED MOBILITY MANAGEMENT IN A CLOUD-BASED COMMUNICATION SYSTEM

BACKGROUND OF THE INVENTION

Group calls, such as talkgroup calls, are an important feature offered by communication systems. In a group call, a group member selects a group and initiates a call to the members of that group. In order for the group call to be effective, all members of the group must be alerted to and connected into the group call.

In order to make sure that all group members are alerted to the call, the communication system of the call initiator must know the members of the group and their current locations. This can be difficult, as the location of each group member is stored on their own communication system, and then must be propagated to all other communication systems that include members of the group. This leads to many inter-system messages. In addition, there can be latency errors when a local database with location of group members is not updated by the time a group call is initiated.

Therefore a need exists for a method and system for providing accurate and timely endpoint information of mobile devices that are members of a common group.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
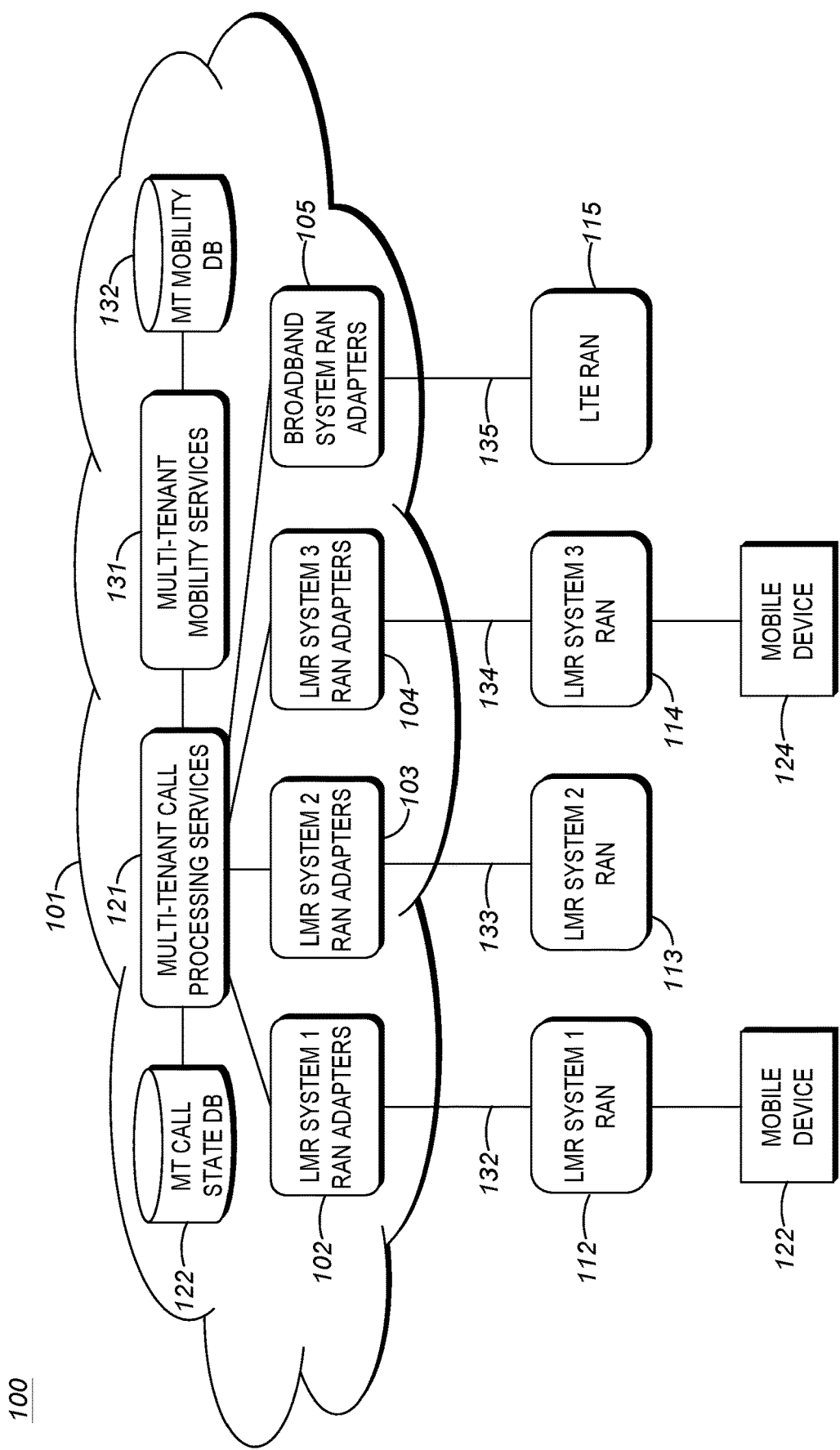
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

FIG. 1 depicts a system diagram of a communication system 100 in accordance with an exemplary embodiment of the present invention. Communication system 100 comprises Call Processing System 101, Land Mobile Radio (LMR) System RAN 112, LMR System RAN 113, LMR System RAN 114, and Long Term Evolution (LTE) System RAN 115. Although only four Radio Frequency (RF) systems (112-115) are shown in FIG. 1 for clarity, it should be understood that communication system 100 could include additional or fewer RF systems. In addition, the type of RF systems within communication system 100 can vary, and can include all RF systems of a single type or any combination of compatible RF systems. Depending on the standard, mobile phones and other wireless connected devices are varyingly known as user equipment (UE), terminal equipment, mobile stations (MS), mobile units, mobile devices, and by other similar names.

A RAN is part of a mobile telecommunication system that implements a radio access technology. In exemplary systems, a RAN resides between a device, such as a mobile phone, a computer, or any remotely controlled machine, and provides connection with a core network, such as Call Processing System 101.

Call Processing System 101 preferably includes LMR System 1 RAN Adapters 102, LMR System 2 RAN Adapters 103, LMR System 3 RAN Adapters 104, Broadband System RAN Adapters 105, Multi-Tenant Call Processing Services 121, Multi-Tenant Call State Database 122, Multi-Tenant Mobility Services 131, and Multi-Tenant Mobility Database 132. In this exemplary embodiment, LMR System 1 RA 102 is operably coupled with LMR System 1 RAN 112 via link 132, LMR System 2 RA 103 is operably coupled with \LMR System 2 RAN 113 via link 133, LMR System 3 RA 104 is operably coupled with LMR System 3 RAN 114 via link 134, and Broadband System RA 105 is operably coupled with LTE RAN 115 via link 135. In an alternate exemplary embodiment, LMR System 1 RA 102 resides in LMR System 1 RAN 112, LMR System 2 RA 103 resides in LMR System 2 RAN 113, LMR System 3 RA 104 resides in LMR System 3 RAN 114, and Broadband System RA 105 resides in LTE RAN 115.

In accordance with an exemplary embodiment, Call Processing System 101 provides cloud-based call processing for multi-system, multi-tenant, multi-technology calls. Call Processing System 101 also preferably provides a fallback solution should a RAN either not desire or not be able to complete calls using Call Processing System 101. In this scenario, a RAN, such as LMR System 1 RAN 112, includes call processing and resource management functionality so that calls can be processed in standalone, fallback mode. The fallback solution provides a flexible system that can result in a single system, single tenant voice call processing service. In this exemplary embodiment, the fallback solution preferably provides a solution that results in a single system, single tenant access permission database that is kept up to date in real time from the multi-system, multi-tenant database, Multi-Tenant Mobility Database 132.

Call Processing System 101 includes a RAN Adaptation Layer, which is preferably comprised of a plurality of RAN Adapters, such as LMR System RAN Adapters 102, LMR System RAN Adapters 103, LMR System RAN Adapters 104, and Broadband System RAN Adapters 105. The RAN Adapters enable a common call processing solution yet still support different technologies, including LMR and Broadband technologies. In an exemplary embodiment, the RAN Adaptation Layer comprises one RAN Adapter per edge component (for example a RAN Adapter per RF or Console site), termination of the layer 2 message delivery protocol (for example a Transport Layer Security (TLS) link to the sites), conversion of technology specific messages to generic services messages, allocation of RAN specific resources (for example allocating RF channels for LMR sites or console bandwidth for console sites done on a per-RAN Adapter level), and RAN component functionality that is considered unique to the specific service rules associated with a RAN (for example resending call grants to an LMR site when a communication device registers at a site).

In accordance with FIG. 1, LMR System RAN Adapters 102 is coupled to LMR System RAN 112, LMR System RAN Adapters 103 is coupled to LMR System RAN 113, LMR System RAN Adapters 104 is coupled to LMR System RAN 114, and Broadband System RAN Adapters 105 is coupled to LTE System RAN 115.

Figure 2:
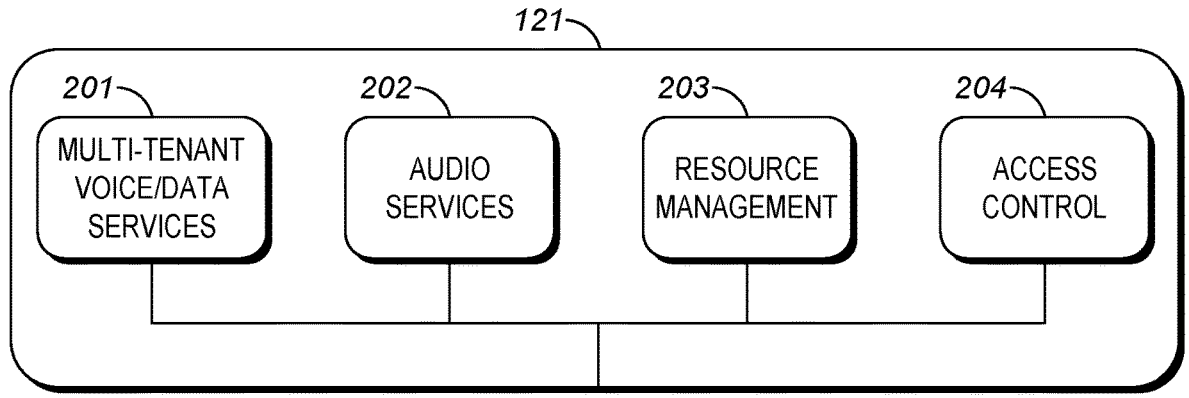
FIG. 2 depicts a multi-tenant call processing services function in accordance with an exemplary embodiment of the present invention.

Multi-Tenant Call Processing Services 121 provides multi-tenant, multi-system, and multi-technology voice call processing service and is depicted in more detail in FIG. 2. In accordance with an exemplary embodiment, Multi-Tenant Call Processing Services 121 is a cloud-based solution that supports multi-tenant voice call processing services and controls at least one access permission database and at least one mobility database, such as Multi-Tenant Mobility Database 132. Multi-Tenant Call Processing Services 121 preferably controls and maintains Multi-Tenant Call State Database 122, for example by writing and reading call information from and to Multi-Tenant Call State Database 122.

Multi-Tenant Call State Database 122 stores the current active call state for every call being processed by Call Processing System 101. the state of the call for active calls, the current audio source of the call, and the priority of the current audio source of the call. The state of the call can be, for example, active voice, hangtime, or call teardown. The current audio source of the call can be, for example, a radio or a console.

Multi-Tenant Mobility Services 131 supports the services necessary to enable radio or console access to the system. In an exemplary embodiment, Multi-Tenant Mobility Services 131 includes the functions of authentication, radio registration, radio affiliation, radio deregistration, console in service, console affiliation, console association, and console out of service. Since the mobility services update and maintain the mobility data associated with these services, access to information in Multi-Tenant Mobility Database 132 preferably flows through Multi-Tenant Mobility Services 131. Therefore, user services, such as group call, preferably access the mobility information via mobility services microservices.

Multi-Tenant Mobility Database 132 preferably stores mobility information for mobile stations and console terminals. In accordance with an exemplary embodiment, Multi-Tenant Mobility Database 132 stores the mobile station (MS) registration state, the MS talkgroup affiliation, the MS site location, the console registration state, and console affiliated talkgroup information. Multi-Tenant Mobility Database 132 can be, for example, an integrated Home Location Register (iHLR), a Gateway HLR (GHLR), a Visitor Location Register (VLR), or a combination of one or more of the above.

In the exemplary embodiment depicted in FIG. 1, LMR System RAN 112 is an ASTRO digital two-way radio communications network that is designed specifically for law enforcement, fire and medical services to communicate with each other during emergency situations. LMR System RAN 112 is a mission critical voice and data communication network and can operate in the 700 MHz, 800 MHz, 900 MHz, UHF and VHF bands for voice and data operation.

In an exemplary embodiment, each of the RANs 112-115 include multiple sites, each site equipped with a plurality of base stations. Each RAN 112-115 also preferably includes software and hardware to allow for fallback operation, which occurs when a RAN desires to operate apart from Call Processing System 101.

In the exemplary embodiment depicted in FIG. 1, LMR System RAN 113 is also an ASTRO digital two-way radio communications network. In this exemplary embodiment, LMR System RAN 113 has a different Wide Area Communications Network (WACN)/System ID information than LMR System RAN 112.

In the exemplary embodiment depicted in FIG. 1, LMR System RAN 114 is a MotoTRBO LMR system that preferably operates in multi-system, cloud-based mode. When the connection between LMR System RAN 114 and Multi-Tenant Call Processing Services 121 goes down, LMR System RAN 114 can fall back to single site operation. This same functionality of falling back to single site operation preferably exists for all RANs in FIG. 1, for example (LMR System RAN 112, LMR System RAN 113, and LTE System RAN 115.

In an exemplary embodiment depicted in FIG. 1, LTE System RAN 115 is an LTE RAN that provides broadband access and services to subscribers.

FIG. 2 depicts multi-tenant call processing services function 121 in additional detail in accordance with an exemplary embodiment of the present invention.

Multi-Tenant Call Processing Services 121 comprises Multi-Tenant Voice/Data Services Processor 201, Audio Services Processor 202, Resource Management Processor 203, and Access Control Processor 204.

Multi-Tenant Voice/Data Services Processor 201 performs the processing of voice calls and data services for mobile devices utilizing Multi-Tenant Call Processing Services 121. In accordance with an exemplary embodiment, the mobile devices utilizing Multi-Tenant Voice/Data Services Processor 201 can be of any technology that is connected to Multi-Tenant Voice/Data Services Processor 201 via the RAN Adaptation layer, which includes RAN Adapters 102-105. Multi-Tenant Voice/Data Services Processor 201 stores and retrieves data in Multi-Tenant Call State Database 122.

Audio Services Processor 202 performs audio functions necessary to support Multi-Tenant Voice/Data Services Processor 201. Audio Services Processor 202, for example, performs the functions of vocoding, devocoding, transcoding, encryption, and decryption. Audio Services Processor 202 may also perform audio routing services, for example, duplication of audio packets and routing to target RAN endpoints, such as RF Sites.

Resource Management Processor 203 provides integrated resource management for multiple systems and multiple technologies. In an exemplary embodiment, Resource Management Processor 203 provides overall call resource management based on a call state determined by each technology. In addition, Resource Management Processor 203 preferably determines the overall call state, such as grant, busy, or reject.

In the exemplary embodiment depicted herein, Resource Management Processor 203 interacts with the resource management processors within the RANs connected to call processing system 101. For example, Resource Management Processor 203 obtains channel/slot resources for each Astro RAN, such as RAN 112 and RAN 113 in FIG. 1. Each RAN preferably includes multiple sites and consoles, and preferably uses ASTRO resource allocation rules. Resource Management Processor 203 preferably obtains slot resources for MOTOTRBO RAN 114 that includes a talkgroup member, preferably using MOTOTRBO resource allocation rules. Similarly, Resource Management Processor 203 preferably uses an Rx interface to obtain bearers per radio for critical users when interfacing with LTE RAN 115, preferably using LTE resource management rules. In accordance with an exemplary embodiment, Resource Management Processor 203 obtains resources from an associated RA.

Access Control Processor 204 isolates data needed for a service to only those needing access. By protecting shared data, privacy is enhanced. Access Control Processor 204 preferably controls access of a calling party and a called party based upon whether the calling party and the called party are allowed to perform a service requested and also whether the calling party and the called party are allowed to perform the requested service at the sites where the service was requested. Access Control Processor 204 also controls access for group calls, such as talkgroup calls, preferably by accessing subscriber access control (SAC) database and retrieving SAC records for each mobile device participating in the call. For talkgroup calls, this includes verifying access to the requested service and whether the requested service is allowed at the site.

Figure 3:
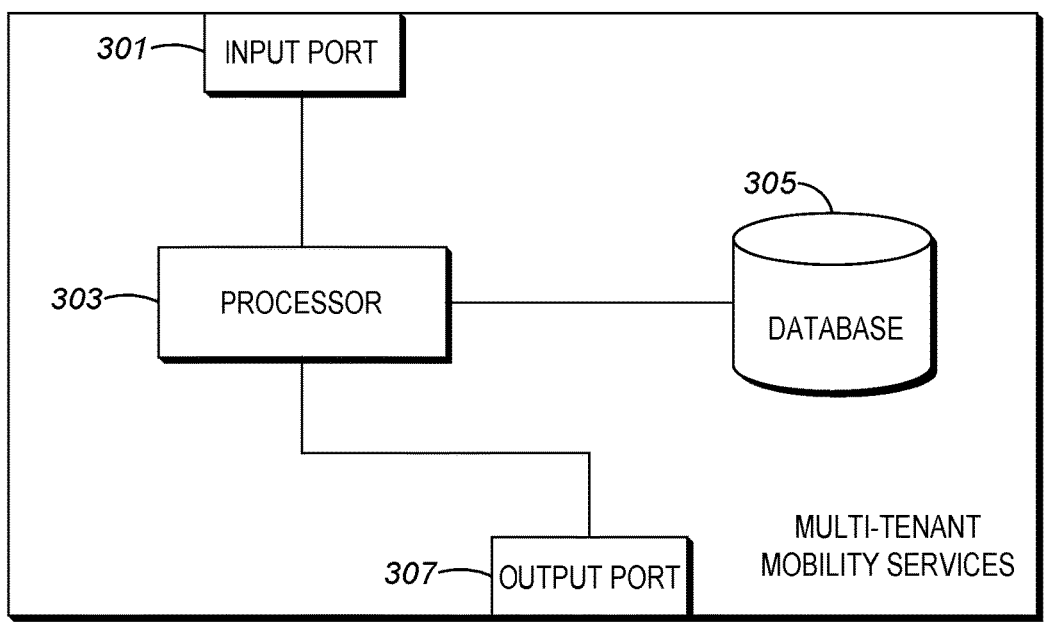
FIG. 3 depicts a schematic diagram of a multi-tenant call processing services function in accordance with an exemplary embodiment of the present invention.

FIG. 3 depicts a schematic diagram of LMR System RAN Adapter 102 in accordance with an exemplary embodiment of the present invention. In the exemplary embodiment depicted in FIG. 3, LMR System RAN Adapter 102 includes an input port 301, a processor 303, a database 305, and an output port 307. Input port 301 and processor 303 communicate over one or more communication lines or buses, as do processor 303 and output port 307. Wireless connections or a combination of wired and wireless connections are also possible.

Input port 301 receives electronic signals and messages from LMR System RAN 112, Multi-Tenant Call Processing Services 121, and Multi-Tenant Mobility Services 131. Output port 307 transmits signals and messages to LMR System RAN 112, Multi-Tenant Call Processing Services 121, and Multi-Tenant Mobility Services 131. As described above, each of these RAN Adapters transmits and receives signals and messages from associated RANs. Input port 301 and output port 307 are electrically connected to processor 303. Although depicted in FIG. 3 as two separate elements, input port 301 and output port 307 can be a single element.

Processor 303 may include a microprocessor, application-specific integrated circuit (ASIC), field-programmable gate array, or another suitable electronic device. Processor 303 obtains and provides information (for example, from database 305 and/or input port 301), and processes the information by executing one or more software instructions or modules, capable of being stored, for example, in a random access memory ("RAM") area of database 305 or a read only memory ("ROM") of database 305 or another non-transitory computer readable medium, such as Multi-Tenant Call State Database 122. The software can include firmware, one or more applications, program data, filters, rules, one or more program modules, and other executable instructions. Processor 303 is configured to retrieve from database 305 and execute, among other things, software related to the control processes and methods described herein.

Database 305 can include one or more non-transitory computer-readable media, and may include a program storage area and a data storage area. The program storage area and the data storage area can include combinations of different types of memory, as described herein. In the embodiment illustrated, database 305 stores, among other things, instructions for processor 303 to carry out the method of FIG. 4.

Figure 4:
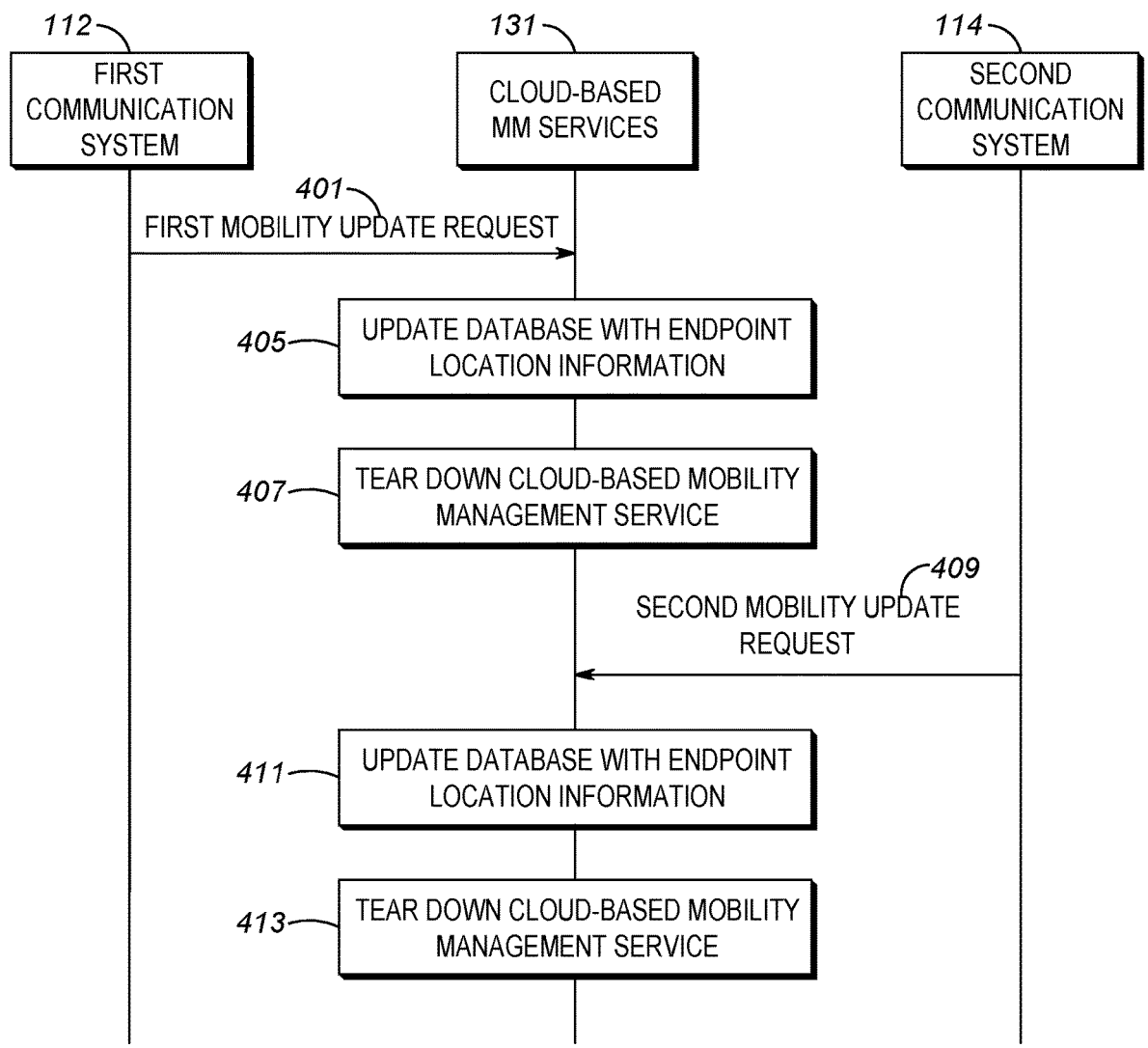
FIG. 4 depicts a call flow diagram in accordance with an exemplary embodiment of the present invention.

FIG. 4 depicts a call flow diagram 400 of a method for tracking endpoint location information of a first mobile device and a second mobile device that are members of a common talkgroup in accordance with an exemplary embodiment of the present invention. In accordance with the exemplary embodiment depicted in FIG. 4, a First Communication System located at LMR System RAN 112 and a Second Communication System located at LMR System RAN 114 are distinct from each other. It should also be understood that this invention works for two communication systems that are utilizing the same over the air (OTA) protocol, such as LMR ASTRO, LMR MotoTRBO, or LTE, or whether the two OTA protocols are different. This is facilitated at least in part because the mobility management functionality is being performed at Cloud-Based Mobility Management Services 131, which is capable of managing mobile devices for multiple technologies, from multiple systems, and for multiple tenants.

In accordance with an exemplary embodiment, First Mobile Device 122 located at a First Communication System within LMR System RAN 112 sends a First Mobility Update Request message 401 to Cloud-Based Mobility Management Services 131. First Mobility Update Request message 401 is preferably sent to Cloud-Based Mobility Management Services 131 via LMR System 1 RA 102 and then routed directly to Cloud-Based Mobility Management Services 131. Alternately, First Mobility Update Request message 401 traverses LMR System 1 RA 102 and Multi-Tenant Call Processing Services 121 prior to being received at Cloud-Based Mobility Management Services 131. In accordance with an exemplary embodiment, First Mobility Update Request message 401 is a request to update parameters associated with First Mobile Device 122, which in this exemplary embodiment is a member of a first talkgroup.

Upon receiving First Mobility Update Request message 401, Cloud-Based MM Service 131 preferably spawns a microservice, which updates (405) MT Mobility Database 132. MT Mobility Database 132 is preferably updated with endpoint information relating to Mobile Device 122 that was received in First Mobility Update Request message 401.

Upon completing the updating of MT Mobility Database 132, Cloud-Based MM Service 131 tears down (407) the Cloud-Based Mobility Management Microservice.

In accordance with an exemplary embodiment, Second Mobile Device 124 located at Second Communication System within LMR System RAN 114 sends a Second Mobility Update Request message 409 to Cloud-Based Mobility Management Services 131. Second Mobility Update Request message 409 is preferably sent directly to Cloud-Based Mobility Management Services 131 via LMR System 3 RA 104. Alternately, Second Mobility Update Request message 409 traverses LMR System 3 RA 104 and Multi-Tenant Call Processing Services 121 prior to being received at Cloud-Based Mobility Management Services 131. In accordance with an exemplary embodiment, Second Mobility Update Request message 409 is a request to update parameters associated with Second Mobile Device 124, which in this exemplary embodiment is a member of the first talkgroup.

In accordance with an exemplary embodiment, First Mobile Device 122 located at a First Communication System within LMR System RAN 112 sends a First Mobility Update Request message 401 to Cloud-Based Mobility Management Services 131. First Mobility Update Request message 401 is preferably sent to Cloud-Based Mobility Management Services 131 via LMR System 1 RA 102 and then routed directly to Cloud-Based Mobility Management Services 131. In accordance with an exemplary embodiment, First Mobility Update Request message 401 is a request to update parameters associated with First Mobile Device 122, which in this exemplary embodiment is a member of a first talkgroup.

Upon receiving Second Mobility Update Request message 409, Cloud-Based MINI Service 131 preferably spawns a new microservice, which updates (411) MT Mobility Database 132. MT Mobility Database 132 is preferably updated with endpoint information relating to Mobile Device 124 that was received in Second Mobility Update Request message 409.

Upon completing the updating of MT Mobility Database 132, Cloud-Based MM Service 131 tears down (413) the Cloud-Based Mobility Management Microservice. In this manner, when an additional request comes in to update parameters relating to a mobile device in MT Mobility Database 132, a new microservice will be spawned.

An exemplary embodiment thereby provides a mobility database that includes information from mobile devices and talkgroups that are located at different communication systems. These distinct communication systems can be located at different RANs, and can also use different over-the-air protocols.

In this manner, when a group call is desired, a group call request can be sent to Multi-Tenant Call Processing Services 121, which retrieves the records for the group from MT Mobility Database 132. These records will include the mobile devices that are members of the group and their locations. Since these group records are up-to-date and located in one place, a quick and accurate notification of all members of the group can be done in an efficient manner. This allows the group call to be completed quicker and more accurately than when utilizing the prior art.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for tracking endpoint location information of a first mobile device and a second mobile device that are members of a common talkgroup, the first mobile device located at a first communication system and the second mobile device located at a second communication system, the method comprising:

receiving a first mobility update request from the first mobile device within the first communication system at a cloud-based mobility management service, the first mobility update request comprising a request to update first endpoint location information of the first mobile device within the first communication system, wherein the first mobile device is a member of a first talkgroup;

updating a mobility management database with the first endpoint location information for the first mobile device that is a member of the first talkgroup;

receiving a second mobility update request from the second mobile device at the cloud-based mobility management service, the second mobility update request comprising a request to update second endpoint location information of the second mobile device within the second communication system, wherein the second mobile device is the member of the first talkgroup; and updating the mobility management database with the second endpoint location information for the second mobile device that is the member of the first talkgroup.

2. The method of claim 1, wherein the step of updating the mobility management database with the first endpoint location information comprises spawning a first microservice by the cloud-based mobility management service.

3. The method of claim 2, the method further comprising the step of tearing down the first microservice.

4. The method of claim 1, wherein the step of updating the mobility management database with the second endpoint location information comprises spawning a second microservice by the cloud-based mobility management service.

5. The method of claim 4, the method further comprising the step of tearing down the second microservice.

6. The method of claim 1, the method further comprising the step of completing a group call using the first endpoint location information and the second endpoint location information.

7. A cloud-based mobility management service for tracking endpoint location information of a first mobile device and a second mobile device, the first mobile device located at a first communication system and the second mobile device located at a second communication system, the cloud-based mobility management service comprising:

an input port for receiving a first mobility update request from the first mobile device at a cloud-based mobility management service, the first mobility update request comprising a request to update first endpoint location information of the first mobile device within the first communication system, wherein the first mobile device is part of a first talkgroup;

a processor for updating a mobility management database with the first endpoint location information;

wherein the input port further performs receiving a second mobility update request from the second mobile device at the cloud-based mobility management service, the second mobility update request comprising a request to update second endpoint location information of the second mobile device within the second communication system, wherein the second mobile device is part of the first talkgroup; and wherein the processor further performs updating the mobility management database with the second endpoint location information.

8. The cloud-based mobility management service of claim 7, wherein the processor performs updating the mobility management database with the first endpoint location information by spawning a first microservice.

9. The cloud-based mobility management service of claim 8, wherein the processor further performs tearing down the first microservice.

10. The cloud-based mobility management service of claim 7, wherein the processor performs updating the mobility management database with the second endpoint location information by spawning a second microservice.

11. The cloud-based mobility management service of claim 10, wherein the processor further performs tearing down the second microservice.

12. The cloud-based mobility management service of claim 7, wherein the processor further performs completing a group call using the first endpoint location information and the second endpoint location information.

* * * * *